(12) United States Patent
Cook et al.

(10) Patent No.: US 6,374,814 B1
(45) Date of Patent: Apr. 23, 2002

(54) ELECTRIC EXHAUST GAS RECIRCULATION VALVE WITH INTEGRAL POSITION SENSOR AND METHOD OF MAKING

(75) Inventors: John Edward Cook, Chatham (CA); Scott Hussey, Clinton Township, MI (US)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/671,927

(22) Filed: Sep. 28, 2000

(51) Int. Cl.[7] .................... F02M 25/07; F16K 31/06; H01F 7/128
(52) U.S. Cl. .................... 123/568.21; 251/129.15; 335/219; 335/278
(58) Field of Search ............... 123/568.11, 568.18, 123/568.21; 251/129.01, 129.15, 129.16; 335/219, 255, 260, 278

(56) References Cited

U.S. PATENT DOCUMENTS

| | | | | |
|---|---|---|---|---|
| 5,460,146 A | * | 10/1995 | Frankenberg | 123/568.21 |
| 5,588,414 A | * | 12/1996 | Hrytzak et al. | 123/568.21 |
| 5,669,364 A | * | 9/1997 | Everingham | 123/568.18 |
| 5,704,585 A | * | 1/1998 | Hrytsak et al. | 251/129.01 |
| 5,722,634 A | * | 3/1998 | Hrytzak et al. | 251/129.15 |
| 5,911,401 A | * | 6/1999 | Hrytzak et al. | 251/129.15 |
| 6,073,617 A | * | 6/2000 | Busato et al. | 123/568.18 |

* cited by examiner

Primary Examiner—Willis R. Wolfe

(57) ABSTRACT

The valve has a solenoid actuator and a position sensor providing an electric signal of the position of the solenoid armature. The solenoid is an electromagnet coil disposed on a plastic bobbin. The magnetic circuit contains a stator member having a flange disposed against a flange of the bobbin, and the position sensor has a plastic housing having a base that captures the stator member flange against the bobbin flange. The stator member flange contains apertures through which non-metallic material that joins with the bobbin flange passes to join with the position sensor housing base, thereby uniting the bobbin and the position sensor housing in assembly capturing the stator member flange. The assembly may be fabricated by an insert molding method or a method in which joining material is melted.

12 Claims, 1 Drawing Sheet

ELECTRIC EXHAUST GAS RECIRCULATION VALVE WITH INTEGRAL POSITION SENSOR AND METHOD OF MAKING

FIELD OF THE INVENTION

This invention relates to exhaust gas recirculation (EGR) valves for internal combustion engines, and is particularly directed to a novel construction for integrating a position sensor with an electric actuator in such a valve.

BACKGROUND AND SUMMARY OF THE INVENTION

Controlled engine exhaust gas recirculation is a known technique for reducing oxides of nitrogen in products of combustion that are exhausted from an internal combustion engine to atmosphere. A typical EGR system comprises an EGR valve that is controlled in accordance with engine operating conditions to regulate the amount of engine exhaust gas that is recirculated to the induction fuel-air flow entering the engine for combustion so as to limit the combustion temperature and hence reduce the formation of oxides of nitrogen.

Because they are typically engine-mounted, EGR valves are subject to harsh operating environments that include wide temperature extremes and vibrations. Tailpipe emission requirements impose more stringent demands for improved control of such valves. An electric actuator, such as a solenoid, is one device for obtaining improved control. Further control improvement can be obtained by associating a position sensor with the electric actuator to sense the position to which the valve is being opened by the actuator, and by using position feedback to control the electric current that operates the actuator. Such an actuator and position sensor must be able to operate properly in such extreme environments for extended periods of use.

A known construction for an EGR valve that comprises an electric actuator and associated position sensor also has a single electric connector for mating which a complementary connector of a wiring harness in a motor vehicle to make electric circuit connections of both actuator and position sensor to an electric control circuit that operates the valve. That connector may be part of the position sensor housing. Terminations of the wire forming the electric actuator must be soldered, or in some way joined, to corresponding electric terminals that are part of the connector.

It is believed that improvements provided by the present invention may avoid possible failures modes that could occur in an EGR valve having the construction just described, thereby making an EGR valve less prone to failure. The improvements arise by better integration of the position sensor with the actuator.

Moreover, in mass-production automotive vehicle applications, component cost-effectiveness is important. An EGR valve electric actuator and associated position sensor that possess an arguably more rugged construction and a capability for improved control is believed desirable for use in a vehicle having an internal combustion engine that is equipped with an EGR system.

The present invention relates to new and unique construction for an EGR valve, particularly a construction in which a position sensor is integrated with an electric actuator in new and improved ways.

A general aspect of the invention relates to an exhaust gas recirculation valve for an internal combustion engine comprising an inlet port at which exhaust gas enters the valve, an outlet port at which exhaust gas exits the valve, and a valve element for selectively restricting exhaust gas flow between the inlet port and the outlet port. An electric actuator comprises an electromagnet coil disposed on a non-metallic bobbin having a flange bounding one end of the coil. An armature forms a portion of a magnetic circuit that is operated by the coil for selectively positioning the valve element. A position sensor provides an electric signal of armature position. The magnetic circuit further comprises a stator member having a flange disposed against the flange of the bobbin, and the position sensor further comprising a non-metallic housing having a base that captures the stator member flange against the bobbin flange. The stator member flange comprises apertures through which non-metallic material that joins with the bobbin flange passes to join with the position sensor housing base to thereby unite the bobbin and the position sensor housing in assembly capturing the stator member flange.

Another general aspect relates to a method of making the valve by capturing the stator member flange between the bobbin flange and the housing base, and then joining the bobbin flange and the housing base through the stator member flange apertures by a material melting process.

Still another general aspect relates to a method of making the valve by disposing the stator member in a mold cavity, and injecting non-metallic material into the cavity to create the bobbin and the position sensor housing, including causing the injected non-metallic material to pass through the apertures in the stator member flange, and allowing the injected material to cure to cause the stator member flange to be captured between the bobbin flange and the housing base, and the bobbin flange and the housing base to be integrally joined through the stator member flange apertures by cured injected material.

Still another general aspect relates to an exhaust gas recirculation valve for an internal combustion engine comprising an inlet port at which exhaust gas enters the valve, an outlet port at which exhaust gas exits the valve, and a valve element for selectively restricting exhaust gas flow between the inlet port and the outlet port. An electric actuator comprises an electromagnet coil disposed on a polymeric bobbin having a flange bounding one end of the coil. An armature forms a portion of a magnetic circuit that is operated by the coil for selectively positioning the valve element. A position sensor provides an electric signal of armature position. The magnetic circuit further comprises a stator member having a flange disposed against the flange of the bobbin, and the position sensor further comprises a housing having a polymeric base that captures the stator member flange against the bobbin flange. The stator member flange comprises apertures through which polymeric material integrally joins the bobbin flange and the position sensor housing base in assembly.

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PROFFERED EMBODIMENT

Figure 1:
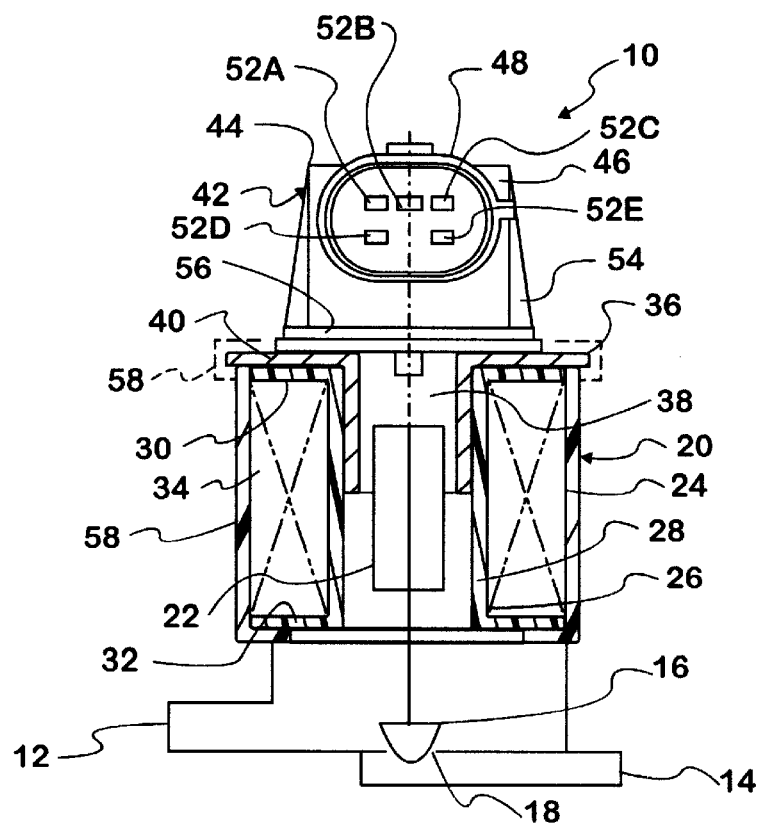
FIG. 1 is a front elevation view, partly in cross section and partly schematic, of an electric EGR valve including a position sensor, according to principles of the invention.
Figure 2:
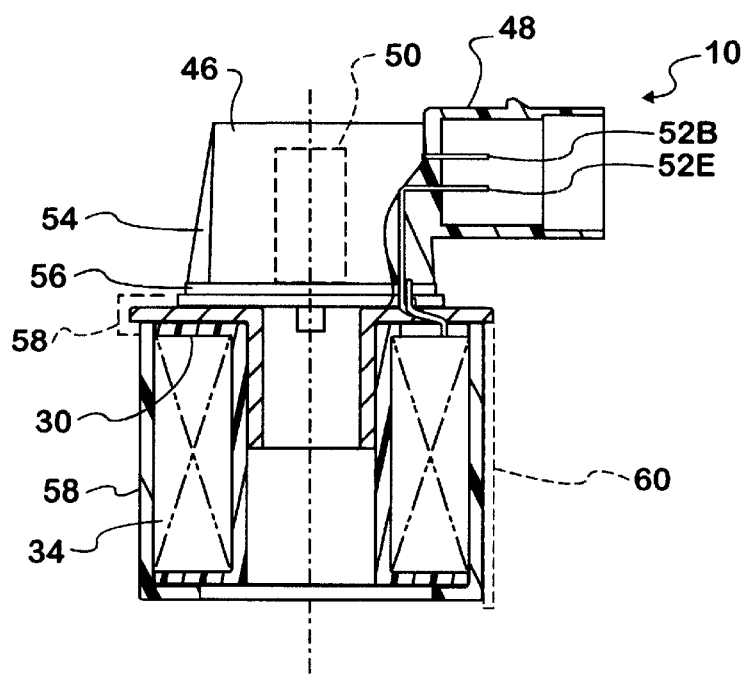
FIG. 2 is a left side elevation view of FIG. 1, partly in cross section.

FIGS. 1 and 2 illustrate an electric EGR valve 10 embodying principles of the present invention. Valve 10 comprises an inlet port 12, an outlet port 14, and a valve element 16 that is positionable relative to a valve seat 18 for controlling exhaust gas flow between inlet port 12 and outlet port 14. The two ports, the valve element, and the seat are schematically shown only in FIG. 1.

Valve 10 further comprises an electric actuator 20 that includes an armature 22 that positions valve element 16 relative to seat 18. Actuator 20 comprises a solenoid 24 that includes a non-metallic bobbin 26 having a straight cylindrical tubular core 28 and upper and lower flanges 30 and 32 at the opposite axial ends of core 28. A length of magnet wire is wound on core 28 between flanges 30 and 32 to form an electromagnet coil 34 of the solenoid.

The bobbin is preferably an injection-molded plastic that possesses dimensional stability over a range of temperature extremes that are typically encountered in automotive engine usage. Flanges 30 and 32 have circular shapes, with flange 30 having a slot through which terminations of the magnet wire can pass as seen in FIG. 2.

Actuator 20 further comprises upper and lower stator members that are cooperatively associated with coil 34 to form the magnetic circuit of the solenoid. Only upper stator member 36 is shown in the FIGS. It comprises a straight cylindrical side wall 38 having a flange 40 extending around its outside proximate its upper end. It fits to the upper end of bobbin 26 in the manner shown, with flange 40 including a slot that registers with the slot in flange 30 providing passage for the magnet wire terminations.

A position sensor 42 is associated with actuator 20 and comprises a housing 44 that, like bobbin 26, is non-metallic, preferably a suitable polymeric material. Housing 44 comprises a central cylindrical tower 46 and a surround 48 that projects radially outwardly from tower 46. Tower 46 has a hollow interior shaped to house a position sensing device 50 that is utilized for sensing the extent to which valve element 16 is open. Housing 44 further contains several electrical terminals that provide for device 50 and coil 34 to be operatively connected with an electrical control system. In this example there are five terminals 52A, 52B, 52C, 52D, and 52E. Ends of these terminals are disposed interiorly of surround 48 to collectively form an electrical connector that is adapted to mate with a mating connector (not shown) of an electrical wiring harness of the electrical system. Housing 44 also comprises a series of integral triangularly shaped walls 54 spaced circumferentially around tower 46 that provide improved structural rigidity for the tower to a base 56 which is disposed against stator member 36 and with which the tower is integrally formed. Base 56 is open to the open space within stator member 36 and bobbin 26 to provide for a plunger of position sensing device 50 to follow the position of armature 22 as it is positioned to correspondingly position valve element 16.

Terminals 52A, 52B, 52C provide for electrical connection of position sensing device 50 to the electrical system, while terminals 52D, 52E provide for electrical connection of coil 34 to the system. In addition to the registered slots in flanges 30 and 40 that provide for terminations of coil 34 to pass through for making connection of the coil to respective terminals 52D, 52E, flange 40 has several slots, or apertures, that provide for housing 44 to be joined to bobbin 26 by joining base 56 to bobbin flange 32. By making the bobbin and the housing of the same material, or of different materials that can be directly joined, a material melting process, such as welding or heat staking, can be used to join the two parts together. As the joining process is being performed, the bobbin flange and housing base may be forced together, sandwiching the stator member flange between them, to create a joint that upon completion of the process is tight and secure and requires no separate fasteners. Bobbin flange 52 and/or base 56 may have projections for fitting to the apertures in stator member flange 40 to provide material that can be melted to unite the bobbin and the position sensor housing.

Thereafter, the joint may be sealed by an encapsulation layer 58 applied over the exterior around the full perimeter. The encapsulation layer may extend to also encapsulate coil 34 on bobbin 26. In the finished construction, an outer shell 60 is disposed between the upper and lower stator member flanges to complete the magnetic circuit.

Position sensing device 50 may be present within housing 44 before the housing and the bobbin are joined in the manner that is been described. Alternatively, it may not be present within housing 44 at the time the housing and bobbin are joined. In the latter case, housing 44 make contain a hollow interior space that provides for position sensing device 50 to be inserted through an opening in the housing after the housing and bobbin have been joined. Terminals 52A, 52B, and 52C are connected in any suitable manner to respective terminals of position sensing device 50 either before, during, or after insertion of the device into the housing to establish proper electric connection of device 50 in EGR valve 10. The opening through which the position sensing device was inserted is thereafter closed by a suitable closure. For example the top wall of tower 46 may be open to provide for insertion of the position sensing device into the housing. After the position sensing device has been inserted and electrically connected to terminals 52A, 52B, and 52C, the open top of the tower is closed by a cap.

Another way to join housing 44 and bobbin 26 is by fabricating them as a single unitary part. Upper stator member 36 forms an insert that is placed in a suitably shaped molding cavity. Synthetic material, a suitable plastic for example, for creating housing and bobbin is injected into the cavity and allowed to cure, capturing the insert in the process. Thereafter, coil 34 is wound on the bobbin. Terminals 52A, 52B, 52C, 52D, and 52D may also be inserts in the mold cavity. Suitable provision is made, either in the mold cavity, or after molding, to provide for the terminations of coil 34 to be joined to respective terminals 52D and 52E. In this method of fabrication, housing 44 is formed with an opening thought which position sensing device 50 is inserted and connected to terminals 52A, 52B, and 52C. The opening is subsequently closed by a suitable closure.

The invention provides important advantages. For one, the terminals are believed less prone to corrosion. For another, fretting of the terminals due to relative movement between the bobbin and position sensor housing can be avoided because of the direct joining of the housing and the bobbin, either by welding separately molded parts, or by integrally molding them as a single unitary part. Because there is no such relative movement, strain relief for the coil terminations is believed unnecessary. By overmolding the joint between the sensor housing and the bobbin with encapsulation layer 58, an O-ring seal between them becomes unnecessary. Elimination of that O-ring not only eliminates a part from the overall part count, but also eliminates the required groove for the O-ring. Elimination of that groove may improve the magnetic circuit joint between the upper stator member flange and the outer shell by providing a better fit of one to the other. A spring used to force the bobbin against the upper stator element may also be eliminated, further reducing the overall part count. A crimp, or clinch, ring is unnecessary, as are multiple fasteners such as screws. Elimination of various parts aids in reducing the overall height of the valve, which can be a significant consideration when a valve is mounted upright on an engine within an engine compartment of a motor vehicle.

While the foregoing has described a preferred embodiment of the present invention, it is to be appreciated that the inventive principles may be practiced in any form that falls within the scope of the following claims.

What is claimed is:

1. An exhaust gas recirculation (EGR) valve for an internal combustion engine comprising an inlet port at which exhaust gas enters the valve, an outlet port at which exhaust gas exits the valve, a valve element for selectively restricting exhaust gas flow between the inlet port and the outlet port, an electric actuator comprising an electromagnet coil disposed on a non-metallic bobbin having a flange bounding one end of the coil and an armature forming a portion of a magnetic circuit that is operated by the coil for selectively positioning the valve element, and a position sensor providing an electric signal of armature position, the magnetic circuit further comprising a stator member having a flange disposed against the flange of the bobbin, and the position sensor further comprising a non-metallic housing having a base that captures the stator member flange against the bobbin flange, wherein the stator member flange comprises apertures through which non-metallic material that joins with the bobbin flange passes to join with the position sensor housing base to thereby unite the bobbin and the position sensor housing in assembly capturing the stator member flange.

2. An EGR valve as set forth in claim 1 further including an encapsulant layer disposed in external covering relation to the perimeter of the position sensor housing base, the stator member flange, and the bobbin flange.

3. An EGR valve as set forth in claim 2 in which the encapsulant layer extends in external covering relation to the coil.

4. An EGR valve as set forth in claim 1 in which the non-metallic bobbin comprises a polymeric material and the non-metallic position sensor housing comprises a polymeric material.

5. A method of making an exhaust gas recirculation (EGR) valve that comprises an inlet port at which exhaust gas enters the valve, an outlet port at which exhaust gas exits the valve, a valve element for selectively restricting exhaust gas flow between the inlet port and the outlet port, an electric actuator comprising an electromagnet coil disposed on a non-metallic bobbin having a flange bounding one end of the coil and an armature forming a portion of a magnetic circuit that is operated by the coil for selectively positioning the valve element, and a position sensor providing an electric signal of armature position, the magnetic circuit further comprising a stator member having a flange disposed against the flange of the bobbin, and the position sensor further comprising a non-metallic housing having a base that captures the stator member flange against the bobbin flange, and the stator member flange comprising apertures, the method comprising:

capturing the stator member flange between the bobbin flange and the housing base, and joining the bobbin flange and the housing base through the stator member flange apertures by a material melting process.

6. A method as set forth in claim 5 including applying an encapsulant layer in external covering relation to the perimeter of the position sensor housing base, the stator member flange, and the bobbin flange.

7. A method as set forth in claim 6 including applying the encapsulant layer in external covering relation to the coil.

8. A method of making an exhaust gas recirculation (EGR) valve that comprises an inlet port at which exhaust gas enters the valve, an outlet port at which exhaust gas exits the valve, a valve element for selectively restricting exhaust gas flow between the inlet port and the outlet port, an electric actuator comprising an electromagnet coil disposed on a non-metallic bobbin having a flange bounding one end of the coil and an armature forming a portion of a magnetic circuit that is operated by the coil for selectively positioning the valve element, and a position sensor providing an electric signal of armature position, the magnetic circuit further comprising a stator member having a flange disposed against the flange of the bobbin, and the position sensor further comprising a non-metallic housing having a base that captures the stator member flange against the bobbin flange, and the stator member flange comprising apertures, the method comprising:

disposing the stator member in a mold cavity, and injecting non-metallic material into the cavity to create the bobbin and the position sensor housing, including causing the injected non-metallic material to pass through the apertures in the stator member flange, and allowing the injected material to cure to cause the stator member flange to be captured between the bobbin flange and the housing base, and the bobbin flange and the housing base to be integrally joined through the stator member flange apertures by cured injected material.

9. A method as set forth in claim 8 including applying an encapsulant layer in external covering relation to the perimeter of the position sensor housing base, the stator member flange, and the bobbin flange.

10. A method as set forth in claim 9 including winding the coil on the bobbin, and applying the encapsulant layer in external covering relation to the coil.

11. A method as set forth in claim 8 including disposing electric terminals for both the coil and position sensor as inserts in the mold cavity.

12. An exhaust gas recirculation (EGR) valve for an internal combustion engine comprising an inlet port at which exhaust gas enters the valve, an outlet port at which exhaust gas exits the valve, a valve element for selectively restricting exhaust gas flow between the inlet port and the outlet port, an electric actuator comprising an electromagnet coil disposed on a polymeric bobbin having a flange bounding one end of the coil and an armature forming a portion of a magnetic circuit that is operated by the coil for selectively positioning the valve element, and a position sensor providing an electric signal of armature position, the magnetic circuit further comprising a stator member having a flange disposed against the flange of the bobbin, and the position sensor further comprising a housing having a polymeric base that captures the stator member flange against the bobbin flange, wherein the stator member flange comprises apertures through which polymeric material integrally joins the bobbin flange and the position sensor housing base in assembly.

* * * * *